United States Patent [19]
Conrad et al.

[11] Patent Number: 5,163,410
[45] Date of Patent: Nov. 17, 1992

[54] FUEL CIRCUIT WITH THERMOSTAT-CONTROLLED FUEL PREHEATING FOR PREFERABLY AIR-COMPRESSING INJECTION-TYPE INTERNAL COMBUSTION ENGINES

[75] Inventors: Ulrich Conrad, Asperg; Gerd Niemeier; Lucian Betke, both of Stuttgart, all of Fed. Rep. of Germany

[73] Assignee: Mercedes-Benz AG, Fed. Rep. of Germany

[21] Appl. No.: 836,878

[22] Filed: Feb. 19, 1992

[30] Foreign Application Priority Data

Feb. 20, 1991 [DE] Fed. Rep. of Germany ....... 4105232

[51] Int. Cl.⁵ .................... F02M 31/16; F02M 31/10
[52] U.S. Cl. .................... 123/557; 123/552; 123/41.82 R
[58] Field of Search ........... 123/557, 552, 545, 547, 123/41.82, 41.81, 41.79

[56] References Cited

U.S. PATENT DOCUMENTS

| | | | |
|---|---|---|---|
| 1,467,497 | 9/1923 | Philip | 123/41.79 |
| 4,754,741 | 7/1988 | Houtman | 123/557 |
| 4,811,719 | 3/1989 | Baumann | 123/557 |
| 4,934,330 | 6/1990 | Lindsay | 123/557 |
| 5,042,447 | 8/1991 | Stone | 123/557 |
| 5,048,501 | 9/1991 | Smith et al. | 123/557 |

FOREIGN PATENT DOCUMENTS

0258529 3/1988 European Pat. Off.
0108859 6/1984 Japan .................... 123/557

Primary Examiner—Tony M. Argenbright
Assistant Examiner—M. Macy
Attorney, Agent, or Firm—Evenson, Wands, Edwards, Lenahan & McKeown

[57] ABSTRACT

A fuel circuit is disclosed for air-compressing injection-type internal combustion engines. The fuel circuit is provided with thermostat-controlled fuel preheating and has a switch-over valve controlled as a function of fuel temperature and a heat exchanger as a combined structural unit. The heat exchanger, through which only fuel flows, protrudes into the cooling water flow of the cooling water duct extending in the cylinder head.

9 Claims, 2 Drawing Sheets

FUEL CIRCUIT WITH THERMOSTAT-CONTROLLED FUEL PREHEATING FOR PREFERABLY AIR-COMPRESSING INJECTION-TYPE INTERNAL COMBUSTION ENGINES

BACKGROUND AND SUMMARY OF THE INVENTION

The invention concerns a fuel circuit with thermostat-controlled fuel preheating for preferably air-compressing injection-type internal combustion engines of the type having cooling water ducts extending in the engine cylinder head.

Fuel circuits with measures for heating the fuel are sufficiently known. European Patent Document No. EP 0 258 529 A2, for example, shows a heat exchanger and a switch-over valve which are combined into one structural unit and are inserted in an intermediate position in a cooling water conduit and a fuel conduit. In the heat exchanger with connections for the water inlet and water outlet, ducts for the cooling water and for the fuel controlled by the adjacent switch-over valve extend separately from one another.

The invention is based on the object of simplifying the thermostat-controlled fuel preheating of the generic type with simultaneous reduction of weight and space requirements.

This object is achieved, in accordance with the invention, by means of an arrangement comprising:

a supply conduit starting from a fuel tank and leading via a fuel filter to a fuel injection pump, a heat exchanger, a switch-over valve in the supply conduit with an expanding-material operating element for controlling the switch-over valve as a function of fuel temperature and guiding the fuel through the heat exchanger at low ambient temperatures, the heat exchanger and the switchover valve being combined into one structural unit, wherein the switch-over valve and the heat exchanger through which only fuel is intended to flow, are fastened to the cylinder head in such a way that the heat exchanger protrudes into the cooling water flow of the cooling water duct extending in the cylinder head.

By means of the special arrangement of the structural unit consisting of the heat exchanger and the switch-over valve, i.e., immersing the heat exchanger protruding from the switch-over valve in the cooling water flow in the cylinder head, the external cooling water conduits become unnecessary. In addition, only the installation space for the switch-over valve with the fuel conduits protruding from the cylinder head into the engine compartment is required.

Other advantageous features of the invention are described in conjunction with the following description and claims.

By means of the special type of fastening according to preferred embodiments of the invention, it is possible to exchange the switch-over valve in a simple manner without removing the heat exchanger in the case of a defect in the thermostat. Cooling water cannot run out during the exchanger procedure.

Other objects, advantages and novel features of the present invention will become apparent from the following detailed description of the invention when considered in conjunction with the accompanying drawings.

DETAILED DESCRIPTION OF THE DRAWINGS

Figure 1:
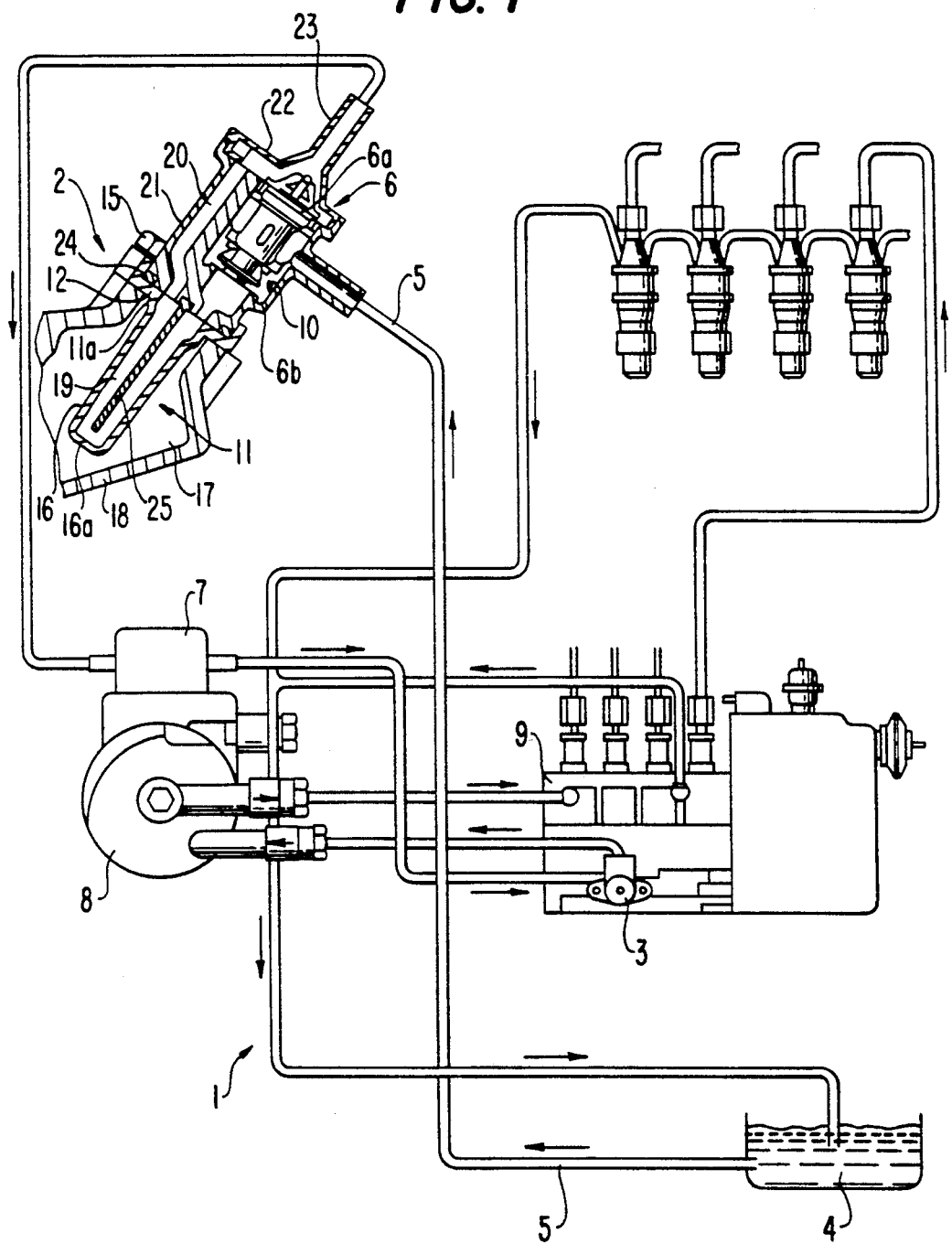
FIG. 1 is a schematic view which shows a fuel circuit with thermostat-controlled fuel preheating, constructed according to a preferred embodiment of the present invention.

FIG. 1 shows a fuel circuit 1 with a thermostat-controlled fuel preheating unit 2 for an air-compressing injection-type internal combustion engine in which a feed pump 3 induces fuel from the fuel tank 4 through a supply conduit 5 via a switch-over valve 6, controlled as a function of fuel temperature, and via an upstream filter 7 and pumps it via a main filter 8 to the fuel injection pump 9.

The switch-over valve 6 is designed as a double-acting plate valve with a wax thermostat as the expanding-material operating element (not shown in any more detail). The plate valve is guided in a cylindrical recess 10 in such a way that its one valve plate 6a controls the direct fuel supply and its other opposite valve plate 6b controls the fuel supply via a heat exchanger 11 located in the path of the coolant flow. The heat exchanger 11 and the switch-over valve form one structural unit, which has a fastening flange 12 as part of the pan-shaped design of heat exchanger 11 on the end 11a facing towards the switch-over valve 6. Flange 12 is provided with four through holes 13, 14 for fastening screws — of which the two fastening screws designated by 15 are used only for fastening the switch-over valve 6 and the two fastening screws designated by 16 are used for fastening the switch-over valve 6 and the heat exchanger 11.

The heat exchanger casing 16, manufactured as a light-metal die casting, protrudes completely into the cooling water flow in the cooling water duct 17 of the cylinder head 18 of the internal combustion engine. The internal space of this casing 16 is subdivided into several chambers 19, fuel flowing sequentially through these chambers. This permits sufficient heating of the fuel. The heated fuel passes through a fuel supply duct 20, in the casing 21 of the switch-over valve 6 and extending parallel to the cylindrical recess 10, into the cover 22 and from there reaches the filter arrangement of the injection pump 9 through a cover-side outlet stub-pipe 23.

The casing 21 of the switch-over valve 6 and the cover 22 are manufactured in plastic and are welded together with the inclusion of the expanding-material operating element and the plate valve in order to avoid additional fastening elements.

At its inner edge, the fastening flange 12 is provided with a recess 24 in which the casing 21 of the switch-over valve 6 is fitted sealingly.

Figure 2:
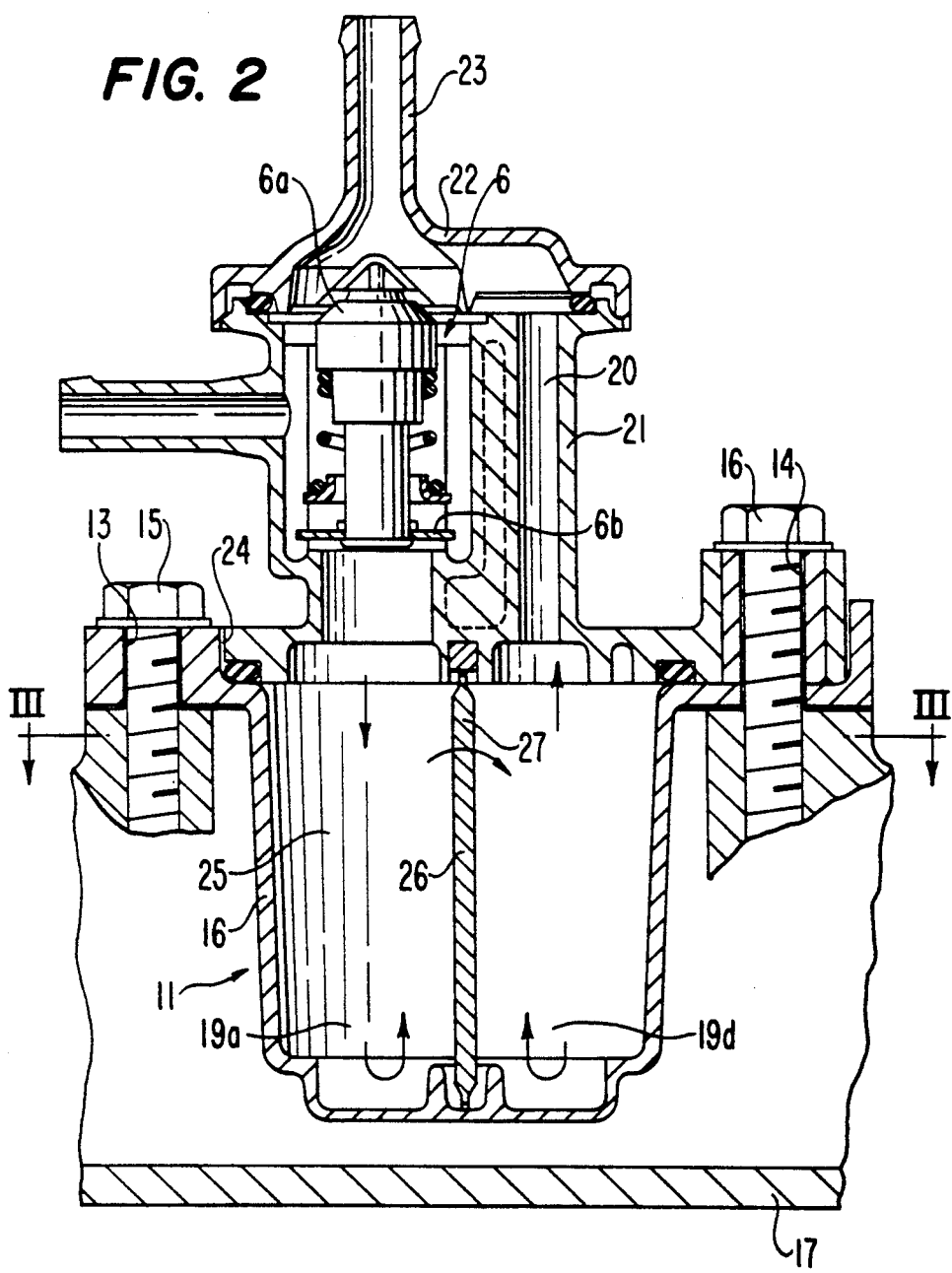
FIG. 2 shows, on an enlarged scale, another embodiment of a fuel preheating arrangement according to the invention.
Figure 3:
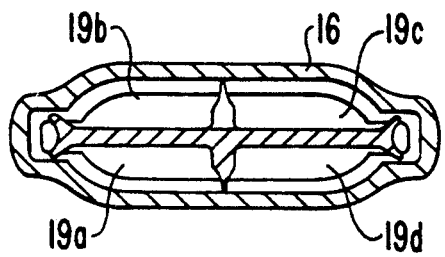
FIG. 3 shows the fuel preheater in section along the line III—III in FIG. 2.

The chambers in the heat exchanger 11 are formed, as shown in FIG. 1, by an inserted separating body 25 which, on the one hand, is connected to the switch-over valve 6 so as to seal and, on the other hand, reaches to within a small distance from the bottom 16a of the heat exchanger casing 16. In FIGS. 2 and 3, there is an arrangement forming the chambers in which a transverse separating body 26 in the heat exchanger casing 16 is additionally provided so that the fuel emerging from the switch-over valve 6 flows first through a chamber 19a, then through the chamber 19b from the bottom to the to via a passage 27 in the separating wall 26 and the chamber 19c and the chamber 19d and finally reaches the fuel supply duct 20 and cover 22. If appropriate, the internal space of the casing can be further subdivided into a large number of chambers, flow occurring through these chambers in the same manner as described. In order to permit intensive heat exchange, the heat exchanger casing 16 can, for example, be designed with ribs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Fuel circuit with thermostat-controlled fuel preheating for preferably air-compressing injection-type internal combustion engines with cooling water ducts extending in the cylinder head, comprising:
   a supply conduit starting from a fuel tank and leading via a fuel filter to a fuel injection pump,
   a heat exchanger,
   a switch-over valve in the supply conduit with an expanding-material operating element for controlling the switch-over valve as a function of fuel temperature and guiding the fuel through the heat exchanger at low ambient temperatures, the heat exchanger and the switch-over valve being combined into one structural unit,
   wherein the switch-over valve and the heat exchanger through which only fuel is intended to flow, are fastened to the cylinder head in such a way that the heat exchanger protrudes into the cooling water flow of the cooling water duct extending in the cylinder head.

2. Fuel circuit according to claim 1, wherein the heat exchanger and the switch-over valve are inserted one inside the other and are fastened to the cylinder head by means of a fastening flange.

3. Fuel circuit according to claim 2, wherein the fastening flange is part of a heat exchanger casing and has through holes for fastening screws, some of said fastening screws being only provided for fastening the heat exchanger and the others being provided for fastening the heat exchanger and the switch-over valve.

4. Fuel circuit according to claim 2, wherein recesses are formed into the fastening flange for the positional fixing of the switch-over valve located on it.

5. Fuel circuit according to claim 1, wherein the switch-over valve is located in a cylindrical recess and is designed as a double-acting plate valve whose one valve plate controls direct fuel supply and whose opposite valve plate controls fuel supply via the heat exchanger, and wherein a fuel supply duct is located in the switch-over valve parallel to the cylindrical recess and fuel guided via the heat exchanger is supplied through the fuel supply duct.

6. Fuel circuit according to claim 3, wherein recesses are formed into the fastening flange for the positional fixing of the switch-over valve located on it.

7. Fuel circuit according to claim 2, wherein the switch-over valve is located in a cylindrical recess and is designed as a double-acting plate valve whose one valve plate controls direct fuel supply and whose opposite valve plate controls fuel supply via the heat exchanger, and wherein a fuel supply duct is located in the switch-over valve parallel to the cylindrical recess and fuel guided via the heat exchanger is supplied through the fuel supply duct.

8. Fuel circuit according to claim 3, wherein the switch-over valve is located in a cylindrical recess and is designed as a double-acting plate valve whose one valve plate controls direct fuel supply and whose opposite valve plate controls fuel supply via the heat exchanger, and wherein a fuel supply duct is located in the switch-over valve parallel to the cylindrical recess and fuel guided via the heat exchanger is supplied through the fuel supply duct.

9. Fuel circuit according to claim 6, wherein the switch-over valve is located in a cylindrical recess and is designed as a double-acting plate valve whose one valve plate controls direct fuel supply and whose opposite valve plate controls fuel supply via the heat exchanger, and wherein a fuel supply duct is located in the switch-over valve parallel to the cylindrical recess and fuel guided via the heat exchanger is supplied through the fuel supply duct.

* * * * *